United States Patent [19]
Hoke et al.

[11] 3,905,487
[45] Sept. 16, 1975

[54] CONTINUOUS STACKING APPARATUS

[75] Inventors: Kenneth E. Hoke; Gerald D. Haynes, both of Marion, Ind.

[73] Assignee: Greene Line Manufacturing Corporation, Marion, Ind.

[22] Filed: Mar. 4, 1974

[21] Appl. No.: 447,862

[52] U.S. Cl. ............... 214/6 H; 214/6 G; 214/6 S; 214/152; 271/182; 271/189; 271/201; 271/224
[51] Int. Cl.² ...................................... B65G 57/112
[58] Field of Search ............ 214/6 D, 6 H, 6 G, 6 S, 214/6 DK, 152; 271/189, 218, 220, 223, 224, 182, 183, 201

[56] References Cited
UNITED STATES PATENTS

| 2,205,767 | 6/1940 | Lamb............................. | 214/6 D X |
|---|---|---|---|
| 2,693,885 | 11/1954 | Junco............................ | 214/6 D |
| 2,753,185 | 7/1956 | Johnson........................ | 271/220 |
| 2,849,236 | 8/1958 | Beaulieu...................... | 214/6 D X |
| 3,150,578 | 9/1964 | Dale et al. .................. | 214/6 H X |
| 3,497,209 | 2/1970 | Smith et al................... | 214/6 D X |
| 3,527,460 | 9/1970 | Lopez........................... | 214/6 G X |

*Primary Examiner*—Robert J. Spar
*Assistant Examiner*—Leslie J. Paperner
*Attorney, Agent, or Firm*—Woodard, Weikart, Emhardt & Naughton

[57] ABSTRACT

An apparatus for continuously stacking articles which does not require shutdown for either stack removal or changes in article size or construction. A first stacking platform stacks material to the desired height by gradually lowering until the desired number of articles have been conveyed onto said first stacking platform. At this time, a second stacking platform automatically extends to assume the stacking operation while the first platform is discharging its stacked load. After discharging its load, the first stacking platform is returned to the stacking position and the second stacking platform is retracted allowing the built-up load to fall onto the first stacking platform. In this manner stacking may be carried out as a continuous operation.

13 Claims, 7 Drawing Figures

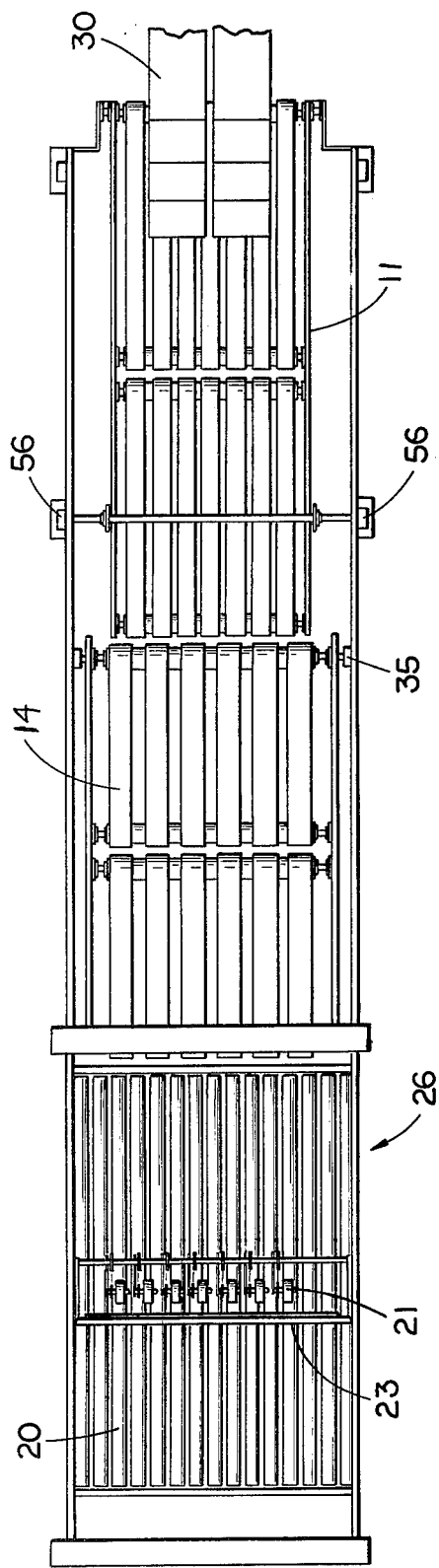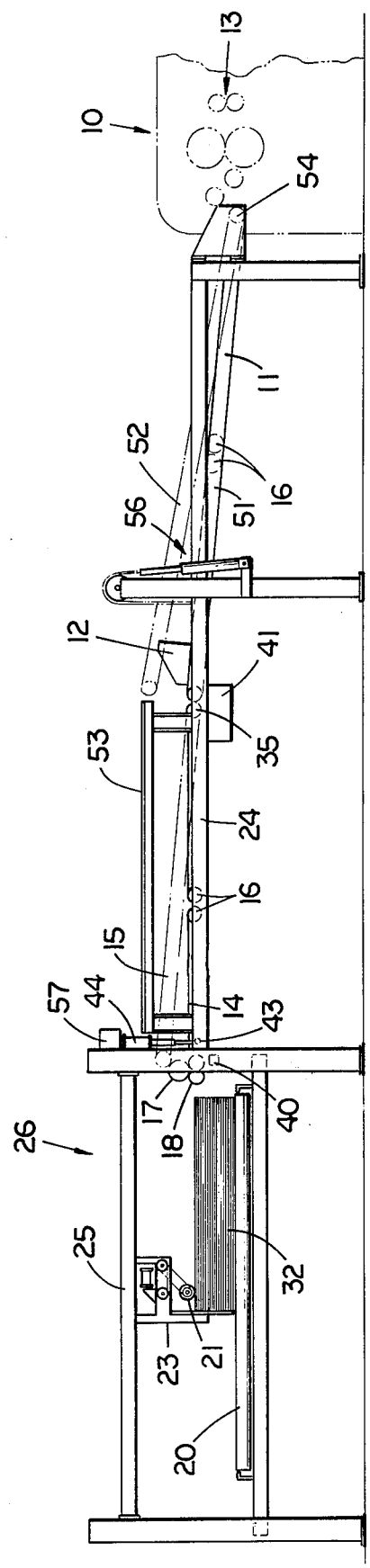
Fig.1
Fig.2

3,905,487

CONTINUOUS STACKING APPARATUS

BACKGROUND OF THE INVENTION

1. Field of the Invention:

This invention relates to mechanical stacking apparatus.

2. Description of the Prior Art:

In the corrugated box industry, sheets of corrugated paperboard material are fed into devices which in turn print information onto the sheets and fold and cut the sheets in order to produce the final product. The sheets are then placed on a conveyor in an overlapping-shingled fashion and then are stacked for convenient shipment and storage. Typically, prior art stacking devices have stacked the box material to the desired height at which time the entire stacking operation must be shut down while the stack is removed. After the stack is removed. The loading platform is again placed in the stacking position and stacking begins once again. This, however, is a significant waste of time, energy and money. Additionally, it is typical for prior art stacking devices to require shutdown for changes in the site and type of the shingled material.

Both of these potential shutdown periods, e.g. during loading platform stack removal and during article size changes, are avoided by the mechanical stacking apparatus of this invention. The present apparatus combines means for continuously operating the stacking procedure while at the same time allowing for an in-progress change in the size, shape, or construction of the material being stacked.

SUMMARY OF THE INVENTION

One embodiment of the present invention includes an apparatus for continuously stacking shingled articles comprising conveyor means for moving shingled articles from a cutter to a stacker. This embodiment further comprises a first stacking platform, a second stacking platform, said second stacking platform being retractable, and means for aligning said shingled articles once they are in a stacked position. In addition, roller means for confining said shingled articles in the proper alignment are provided together with means operable to cause said second stacking platform to extend to the stacking position when said first stacking platform is discharging a load of stacked articles.

It is an object of the present invention to provide a new and continuous stacking apparatus.

A further object of the present invention is to provide means for changing the size and/or shape of the objects to be stacked while the stacking procedure is in progress.

In addition, it is a further object of the present invention to provide a stacking apparatus whereby the objects being stacked are continuously confined and aligned in a symmetrical stack.

Related objects and advantages of the present invention will be apparent from the following description.

BRIEF DESCRIPTION OF THE DRAWINGS

FIG. 1 is a top view of the entire apparatus with the optional scrap storage platform removed.

FIG. 2 is a side view of the entire apparatus.

DESCRIPTION OF THE PREFERRED EMBODIMENT

Figure 3:
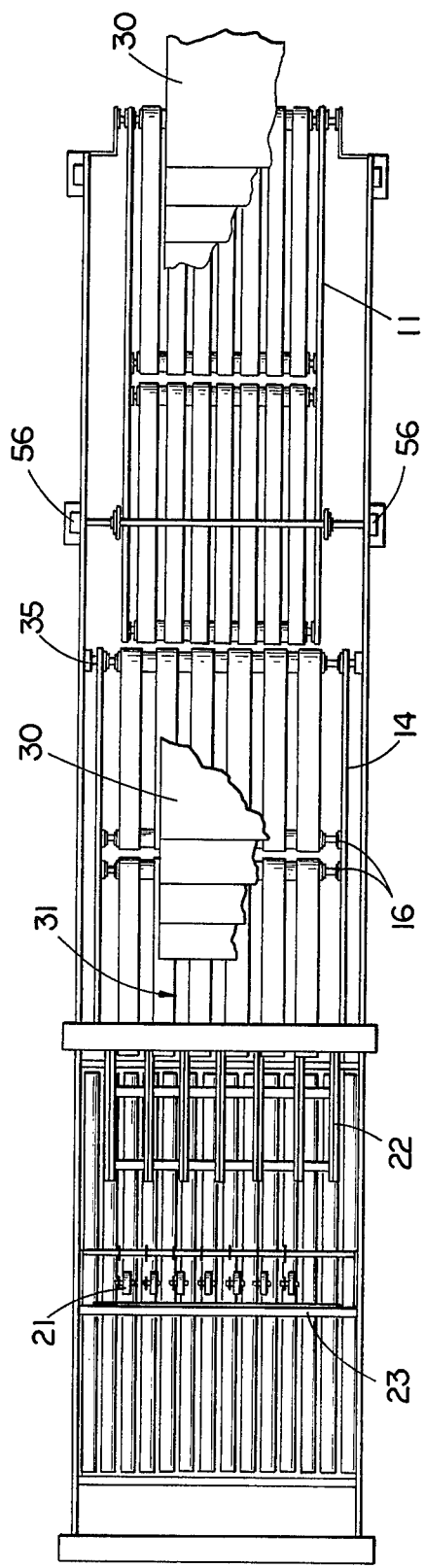
FIG. 3 is a top view of the entire apparatus with the optional scrap storage platform removed showing the hopper partially extended.
Figure 4:
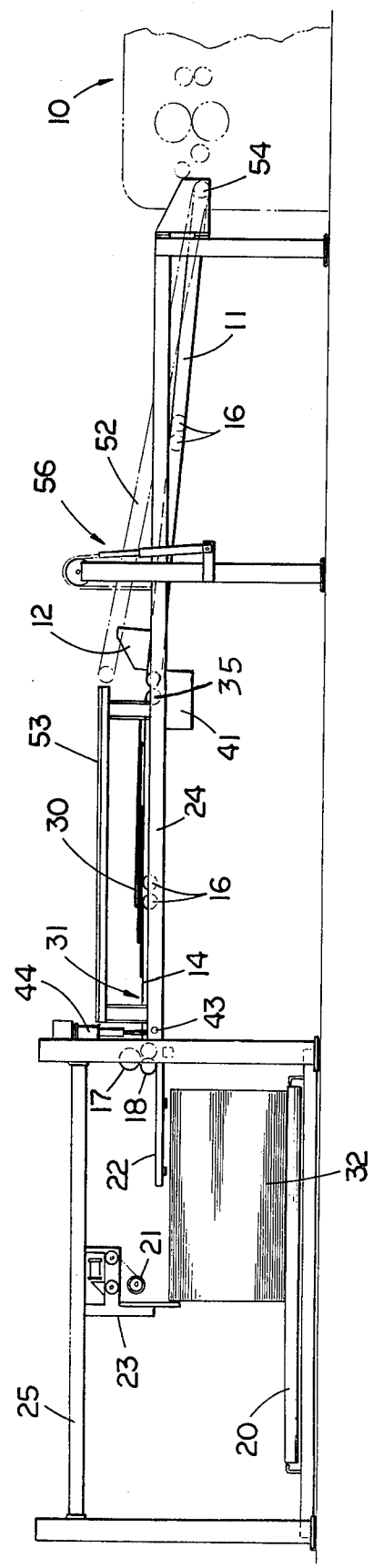
FIG. 4 is a side view of the entire apparatus showing the hopper partially extended.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now particularly to FIG. 2, a cutter 10 is seen at one end of conveyor 11. Cutter 10 can be automatically or manually adjusted to size the material according to length and width during the operation of the conveyor. Cutter 10 discharges the properly sized articles onto conveyor 11. The speeds of conveyor 11 and the conveyor 13 leading into cutter 10 are adjusted so that the articles are discharged in an overlapping-shingled fashion. Under normal conditions this would require conveyor 13 and cutter 10 to be operated at a slightly higher speed than conveyor 11. The shingled articles are then transported on conveyor 11 to a pilot gate 12.

Conveyor 11 is movable from the normal lowered position 51 to a raised position 52. When raised to position 52 conveyor 11 removes scrap automatically to a scrap storage platform 53. The conveyor 11 is lifted by hydraulic or electrical means 56 and pivots at point 54. This scrap removal operation is optional and the scrap which normally occurs may be removed manually.

Under normal circumstances pilot gate 12 is in the raised position and does not affect the flow of shingled articles 30. Pilot gate 12 is movable and can be lowered to momentarily interrupt the continuous flow of shingled articles 30. However, the function of gate 12 in the lower position will be discussed infra. While gate 12 is in its raised position the shingled articles are conveyed from conveyor 11 to conveyor 14 which in turn transports the shingled articles 30 to the stacking area 26. Conveyor 14 is driven by rollers 16.

Figure 5:
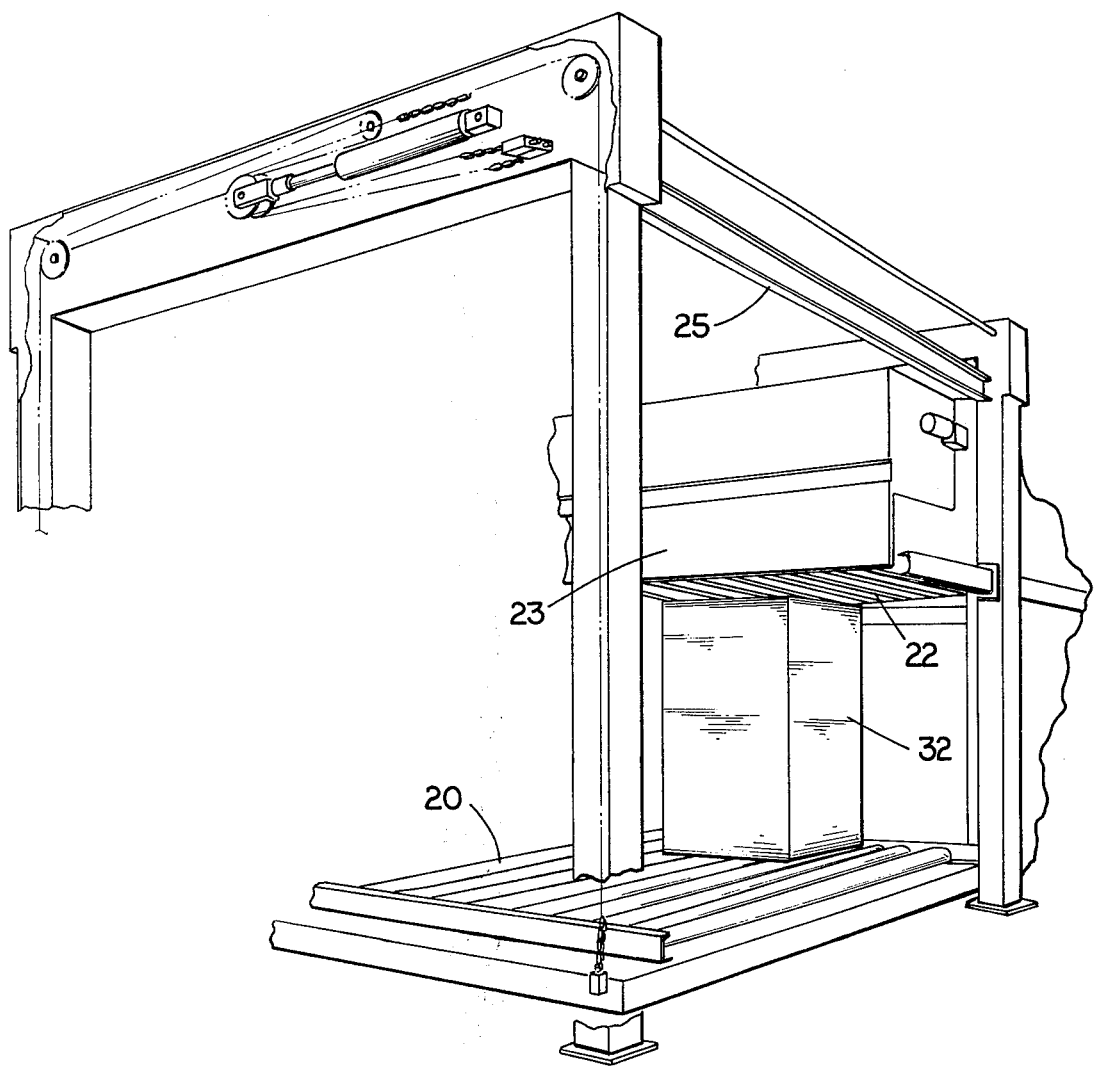
FIG. 5 is an angular view of the elevator portion of the apparatus with the hopper partially extended.

After conveyor 14 has delivered the shingled articles 30 to the stacking area 26, the shingled articles 30 are discharged by rollers 17 and 18 into the stacking area 26. Top roller 17 is an idle roller while bottom rollers 18 are driven rollers. They are driven at a speed somewhat greater than conveyor 14 so that there is no build-up of the shingled articles at rollers 17 and 18. Once the shingled articles have been discharged into stacking area 26 they are continuously pressed against backstop 23. Backstop 23 is adjustable to fit various lengths of shingled articles 30 by means of backstop adjustment bar 25 which in turn may be moved by electric motor 57. The stacked articles 32 which are now pressed and stacked against backstop 23 are held in place by pull-in wheels 21. The stacked articles are supported by elevator 20. Elevator 20 gradually lowers as the number of stacked articles thereon increases. The structure for operating elevator 20 is best shown by FIG. 5. When elevator 20 reaches its maximum stacking height, which also corresponds to its lowest movable position, usually approximately 72 inches, a hopper 22 extends to the stacking area 26. Hopper 22 is conveyed by means of electric motor 41 over track 24 into the stacking area 26.

The hopper may be in any suitable form although a grate is preferred. The gate form facilitates easy retraction of the hopper 22 when the elevator 20 is returned to the stacking position by reducing frictional force between the hopper and stacked articles. At the same time that the grate is extended, conveyor 14 is raised in increments of 1 inch to 4 inches to its maximum raised position 15. Raised position 15 allows from about 12 inches to about 18 inches of stacking height for said hopper 22 as hopper 22 does not lower in a manner similar to elevator 20. The raising of conveyor 14 is controlled by a photoelectric eye (not shown in the drawings). Initially, upon the extension of hopper 22, the conveyor 14 is raised 1 increment which can vary from 1 inch to 4 inches. As soon as the photoelectric eye is covered it activates means for raising conveyor 14 another increment, and so on until the maximum raised position 15 is reached. The increments do not need to be equal in size as some may prefer that the first increment be greater than those following. Additionally, the maximum raised position 15 may not be reached prior to the retraction of hopper 22 and subsequent lowering of conveyor 14 to the normal position. The hopper 22 is used to stack articles until elevator 20 has discharged its load 32 and has returned to the uppermost stacking position. At the same time that elevator 20 returns to the uppermost stacking position, the grate or hopper 22 is automatically retracted and the load 33 on hopper 22 falls onto elevator 20. Again, during this entire process all of the stacked articles are continuously held in proper alignment against backstop 23 by pull-in wheels 21.

This entire sequence of events is actuated by means of pilot gate 12. Pilot gate 12 is designed to automatically lower upon the passage of the requisite amount of material for giving a maximum load 32 to elevator 20. When pilot gate 12 lowers, it creates a gap 31 in the shingled articles. The gap 31 is very brief but nevertheless it is a distinct gap. The gap 31 is created for the purpose of allowing the hopper 22 enough time to extend without causing a backlog of shingled articles. Since there is a very brief period of time, in the order of one to two seconds between the lowering of elevator 20 for removal of its load 32 and the proper placement in the stacking position of hopper 22, a gap 31 is necessary so that a shingled article or articles do not become entrapped between the hopper 22 and the now-discharging elevator 20. Therefore, this gap 31 is created by pilot gate 12. Gap 31 is shown best in FIG. 3.

A photosensitive eye 43 senses when gap 31 passes and causes hopper 22 to extend by means of actuating electric motor 41. At the same time that hopper 22 is being extended, conveyor 14 is incrementally raised and may be raised to a maximum at position 15. Conveyor 14 is incrementally lifted to position 15 by means of hydraulic cylinders 44. Conveyor 14 pivots at point 35. As stated before, the extension of hopper 22 and the raising of conveyor 14 to position 15 permits from about 12 to about 18 inches of stacking height for the interval while elevator 20 is discharging its load 32. On its return from discharging its load 32, elevator 20 trips a switch 40 which causes simultaneously the retraction of hopper 22 and the lowering of conveyor 14 to the normal position from the raised position 15. At this point, normal operations are continued until once again a maximum load 32 is achieved on elevator 20 and another gap 31 is created by pilot gate 12 thus beginning the sequence of events leading to the extension of hopper 22.

It should be noted that through the coordinated operation of both the elevator 20 and the hopper 22 a continuous stacking operation can be carried out. No shutdown is necessary for either removal of the stack 32 which accumulates to maximum height on elevator 20 nor is a shutdown necessary for changes in size and width of the shingled material.

Figure 6:
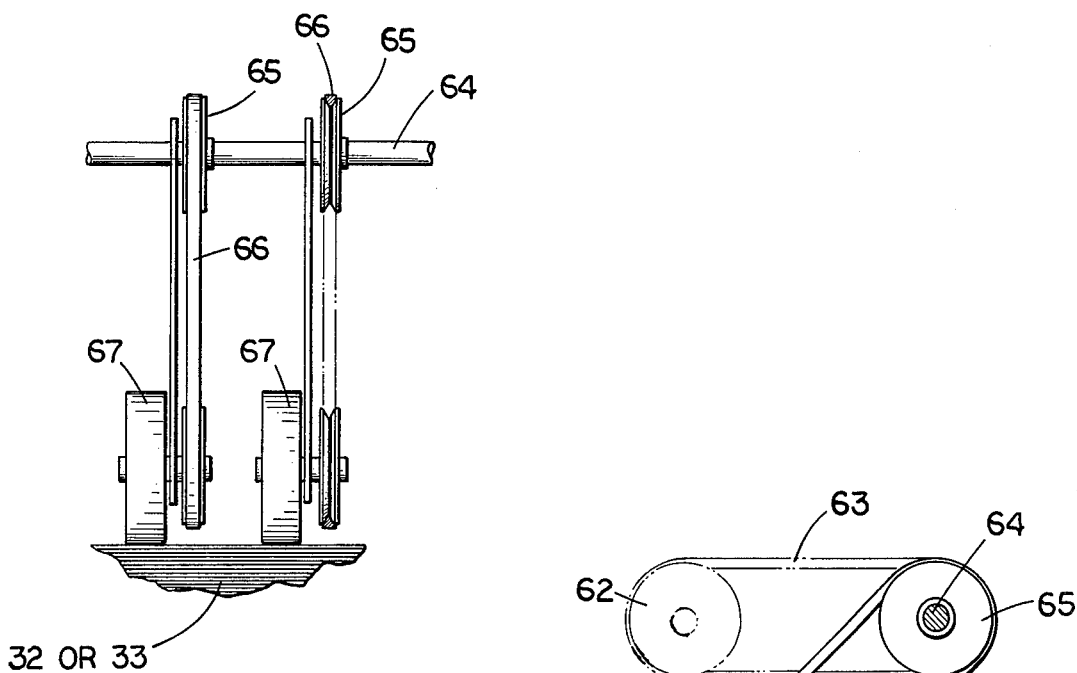
FIG. 6 is a front view of the pull-in wheels as they hold the stacked articles against the backstop.
Figure 7:
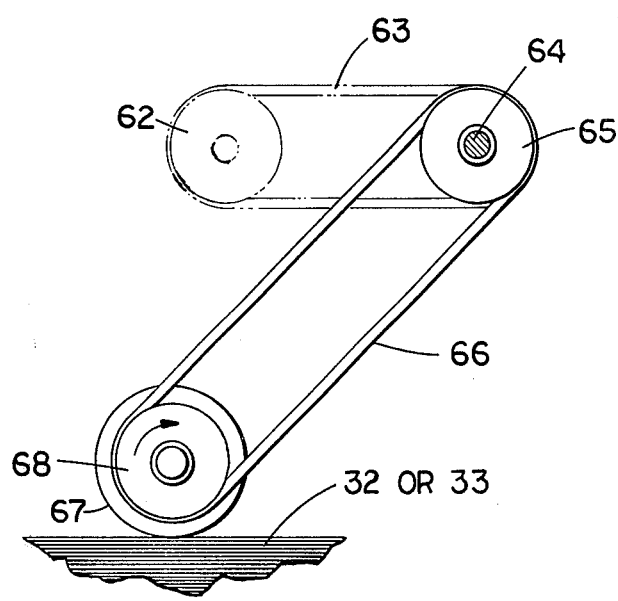
FIG. 7 is a side view of the pull-in wheels as they hold the stacked articles against the backstop.

Of special importance to this invention are pull-in wheels 21. Pull-in wheels 21 are designed to allow multiple stackings of various articles. The fact that there are several wheels 67 keeps each individual stack in the proper alignment against backstop 23. This is superior to the more normal method of placing vertical walls between stacks as no adjustment is required when the number of stacks or the size of the individual stacks is varied. Rather, any size of stack and any number of stacks may be accommodated with no adjustment whatever. This represents a significant advantage and again serves a shutdown of the entire operation for a change over to a different size of shingled article or a different number of stacks. The pull-in wheels are illustrated best by FIGS. 6 and 7. In this embodiment there is a common drive shaft 64, sprockets 62, 65 and 68 and wheel 67. The three sprockets are connected by V-belts 63 and 66. The force is applied as illustrated in FIG. 7, thus holding the stacked articles against the backstop 23.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A continuous stacking apparatus comprising:
   a. conveyor means for moving shingled articles from a cutter to a stacker, said conveyor means including a pivotal conveyor for moving said shingled articles, said pivotal conveyor being pivotal in the vertical plane;
   b. gap creating means extending at least partially over and across said conveyor means and being engageable with and operable to create gaps in said shingled articles providing distinct groups of said articles;
   c. a first stacking platform;
   d. a second stacking platform, said second stacking platform being extendable and retractable;
   e. sensing means positioned adjacent said conveyor means and being operable to sense said gaps when said gaps pass said sensing means;
   f. drive means connected to said second stacking platform and operable upon command from said sensing means to cause said second stacking platform to extend to the stacking position;

g. lifting means connected to said pivotal conveyor and operable to lift said pivotal conveyor upon command from said sensing means; and h. lowering means connected to said first platform operable to lower said first platform.

2. The apparatus of claim 1 wherein said first stacking platform is vertically movable, said first stacking platform moving vertically downward a distance equal to the height of stacked articles.

3. The apparatus of claim 1 wherein said second stacking platform is slidably retractable from said stacking position.

4. The apparatus of claim 1 wherein said second stacking platform is a grate mounted on rollers.

5. The apparatus of claim 1 wherein said first stacking platform has a loading height capacity of from about 5 feet to about 7 feet.

6. The apparatus of claim 1 wherein said second stacking platform has a loading height capacity of from about 12 inches to about 17 inches.

7. The apparatus of claim 6 wherein said lifting means incrementally pivot said pivotal conveyor from about 12 inches to about 18 inches in the upward vertical plane at the same time that said second stacking platform moves to the stacking position.

8. The apparatus of claim 7 wherein said lifting means for pivoting said pivotal conveyor in a vertical plane is a motor.

9. A continuous stacking apparatus comprising:

a. conveyor means for moving shingled articles from a cutter to a stacker, said conveyor means including a pivotal conveyor for moving said shingled articles, said pivotal conveyor being incrementally pivotal from a first position to a plurality of raised positions wherein said pivotal conveyor is incrementally raised to a maximum of from about 12 inches to about 18 inches in the vertical plane;

b. a first stacking platform, said first stacking platform being vertically movable, said first stacking platform moving vertically downward a distance directly equal to the height of the stacked articles, said first stacking platform having a stacking height capacity of from about 5 feet to about 7 feet;

c. a second stacking platform, said second stacking platform being slidably removable from the stacking position, said second stacking platform having a stacking height capacity of from about 12 inches to about 18 inches;

d. means for aligning said shingled articles;

e. roller means for confining said shingled articles in the proper alignment;

f. gap creating means extending at least partially over and across said conveyor means and being engageable with and operable to create gaps in said shingled articles providing distinct groups of said articles;

g. sensing means positioned adjacent said conveyor means and being operable to sense said gaps when said gaps pass said sensing means;

h. drive means connected to said second stacking platform and operable upon command from said sensing means to cause the extension of said second stacking platform to the stacking position while at the same time lifting means connected to said pivotal conveyor causes said pivotal conveyor to pivot to the raised position.

10. The apparatus of claim 9 wherein said second stacking platform is a grate.

11. The apparatus of claim 9 wherein said roller means for confining said shingled articles in the proper alignment comprise a plurality of wheels rotating in a direction so as to continually push said shingled articles against said aligning means.

12. The apparatus of claim 9 wherein said means for aligning said shingled articles is adjustable.

13. A method for continuously stacking shingled articles comprising:

a. shingling articles on a conveyor;

b. conveying said shingled articles to gap creating means;

c. creating gaps in said shingled articles at appropriate intervals of time;

d. conveying said shingled articles subsequent to said gap creating means to a stacking area;

e. stacking said shingled articles on a first stacking platform until said first stacking platform has received a full load of stacked articles, said gap creating means creating a gap in the conveyance of said shingled articles at a time such that when said first stacking platform has received a full load of stacked articles and is ready to be removed for unloading, a gap in the conveyance of shingled articles is present at the point of stacking;

f. removing said first stacking platform from the stacking area to be unloaded while simultaneously drive means operable upon command from gap sensing means extend a second stacking platform into the stacking area;

g. lifting the means for conveying said shingled articles from said gap creating means to said stacking area;

h. returning said first stacking platform to the stacking position; and i. retracting said second stacking platform to allow the shingled articles stacked on said second stacking platform to fall on said first stacking platform.

* * * * *